United States Patent
Thorhallsson et al.

(10) Patent No.: US 11,878,864 B2
(45) Date of Patent: Jan. 23, 2024

(54) SYSTEM AND METHOD FOR AUTOMATED STORAGE, PICKING, AND PACKING OF ITEMS

(71) Applicant: Pickr AS, Stavanger (NO)

(72) Inventors: Torfi Thorhallsson, Reykjavik (IS); Hafrun Hauksdottir, Sandnes (NO); Kjetil Gjerde, Sandnes (NO); Simon Marnburg Eriksen, Hafrsfjord (NO); Mikal Jansen Berge, Sandnes (NO)

(73) Assignee: Pickr AS, Stavanger (NO)

( * ) Notice: Subject to any disclaimer, the term of this patent is extended or adjusted under 35 U.S.C. 154(b) by 555 days.

(21) Appl. No.: 17/277,053

(22) PCT Filed: Sep. 30, 2019

(86) PCT No.: PCT/NO2019/050200
§ 371 (c)(1),
(2) Date: Mar. 17, 2021

(87) PCT Pub. No.: WO2020/067907
PCT Pub. Date: Apr. 2, 2020

(65) Prior Publication Data
US 2021/0371200 A1    Dec. 2, 2021

(30) Foreign Application Priority Data
Sep. 28, 2018  (NO) .................................. 20181263

(51) Int. Cl.
*B65G 1/137*       (2006.01)
*B25J 9/02*        (2006.01)
*B25J 19/02*       (2006.01)

(52) U.S. Cl.
CPC .............. *B65G 1/137* (2013.01); *B25J 9/023* (2013.01); *B25J 19/023* (2013.01); *B65G 2201/0258* (2013.01)

(58) Field of Classification Search
CPC ........ B65G 1/137; B65G 1/0435; B65G 1/08; B65G 1/1375; B25J 9/023; B25J 19/023;
(Continued)

(56) References Cited

U.S. PATENT DOCUMENTS 9,120,622 B1 *   9/2015  Elazary ..................... B66F 9/07
9,598,237 B2 *   3/2017  Cyrulik ............... B65G 47/883
(Continued)

FOREIGN PATENT DOCUMENTS

CA       3139199       7/2016
CN      108455157      8/2018
(Continued)

OTHER PUBLICATIONS

Norwegian Search Report for No. 20181263, dated Apr. 2, 2019.
(Continued)

*Primary Examiner* — Patrick H Mackey
(74) *Attorney, Agent, or Firm* — Andrus Intellectual Property Law, LLP

(57) ABSTRACT

A system is for automatic storage, picking, and packing of items. The system has: an arrangement of shelves for supporting storage boxes; a movable robotic arm, the robotic arm being configured for reaching into and picking an item from a storage box, and for grabbing and moving a storage box; and a camera and control unit, the arrangement of shelves comprises a first sub arrangement of shelves with a first vertical distance between the shelves, and a second sub arrangement of shelves with a second vertical distance between the shelves. The first vertical distance is chosen to allow the robotic arm to reach into and pick an item from said storage boxes. The second vertical distance is chosen so that each storage box must be moved out before the robotic arm can pick an item from the storage box.

12 Claims, 6 Drawing Sheets

(58) Field of Classification Search
CPC . B25J 9/0084; B25J 9/0087; B25J 9/02; B25J 19/04; G06Q 10/08
See application file for complete search history.

(56) References Cited

U.S. PATENT DOCUMENTS

| | | | |
|---|---|---|---|
| 9,688,472 B1* | 6/2017 | Stubbs | B25J 9/1664 |
| 10,360,531 B1* | 7/2019 | Stallman | G06Q 10/087 |
| 10,384,872 B2* | 8/2019 | Wicks | B65G 1/1373 |
| 10,902,377 B2* | 1/2021 | Murphy | G05B 19/124 |
| 10,926,954 B2* | 2/2021 | Mattern | G06Q 10/087 |
| 2013/0245811 A1* | 9/2013 | Holmes | B65B 57/00 700/216 |
| 2015/0332213 A1* | 11/2015 | Galluzzo | G05D 1/0248 700/218 |
| 2017/0066592 A1 | 3/2017 | Bastian et al. | |
| 2017/0190510 A1 | 7/2017 | Porat | |
| 2017/0349376 A1 | 12/2017 | Porat | |
| 2018/0032949 A1 | 2/2018 | Galluzzo et al. | |
| 2018/0057263 A1* | 3/2018 | Beer | B25J 15/0616 |
| 2018/0082162 A1 | 3/2018 | Durham et al. | |
| 2018/0158016 A1 | 6/2018 | Pandya et al. | |
| 2018/0218469 A1 | 8/2018 | Lert, Jr. et al. | |
| 2018/0265297 A1 | 9/2018 | Nakano et al. | |
| 2019/0217471 A1* | 7/2019 | Romano | B25J 15/0616 |
| 2020/0189845 A1* | 6/2020 | Klinge | B25J 15/00 |

FOREIGN PATENT DOCUMENTS

| | | |
|---|---|---|
| DE | 19857282 | 6/2000 |
| DE | 102015015127 | 5/2017 |
| EP | 1122194 | 8/2001 |
| EP | 1997751 | 12/2008 |
| JP | 2001261126 | 9/2001 |
| JP | 2017087404 | 5/2017 |
| JP | 2018020423 | 2/2018 |
| WO | 03010073 | 2/2003 |
| WO | 2012055410 | 5/2012 |

OTHER PUBLICATIONS

International Search Report and the Written Opinion for PCT/NO2019/050200, dated Nov. 18, 2019.
Response to the Written Opinion for PCT/NO2019/050200, dated Jul. 16, 2020.
The Second Written Opinion for PCT/NO2019/050200, dated Oct. 21, 2020.
International Preliminary Report on Patentability for PCT/NO2019/050200, dated Oct. 19, 2020.

* cited by examiner

SYSTEM AND METHOD FOR AUTOMATED STORAGE, PICKING, AND PACKING OF ITEMS

CROSS-REFERENCE TO RELATED APPLICATIONS

This application is the U.S. national stage application of International Application PCT/NO2019/050200, filed Sep. 30, 2019, which international application was published on Apr. 2, 2020, as International Publication WO 2020/067907 in the English language. The International Application claims priority of Norwegian Patent Application No. 20181263, filed Sep. 28, 2018. The international application and Norwegian application are both incorporated herein by reference, in entirety.

FIELD

The invention relates to a system for automatic storage, picking, and packing of items, the system comprising an arrangement of shelves for supporting storage boxes for storing the items; a robotic arm movable within a frame in front of the arrangement of shelves, the robotic arm being configured for reaching into and picking an item from a storage box, and for grabbing and moving a storage box; a camera mounted on the robotic arm; and a control unit comprising software for analysing the data form the camera substantially in real-time, identifying the item to be picked by the robotic arm, and packing the picked item into a packing box. The invention further relates to a method for storage, picking, and packing of items.

BACKGROUND

As the world becomes more digital, our shopping routines are also changing towards being more digital, e.g. online shopping. When the orders are digital, and the customer never enters the store, more focus is put on optimizing effective warehousing in terms of storage space and retrieval time of the stored items, since improved efficiency means lower cost and reduced need for storage space. To improve the efficiency, automatic storage and retrieval systems (ASRS) have been developed, where robotic systems help to keep track of the items and bring them to and from a storage place. The ASRS may be combined with a stationary picking robot, which is able to pick items from a box which may have been brought to it by the ARSR. To be efficient, such a system typically comprises several movable robots per picking robot. The system will therefore be complicated and expensive to set up and run, as it may require that the whole storage area is put on the move, for example using conveyor systems etc.

Alternatively, the picking robot may be able to move around the warehouse and pick items from the shelves. US 20170066592 A1 discloses a system comprising an automated guided vehicle which can move around in a warehouse and pick individual items from the shelves using a robotic arm. The vehicle comprises a loading table which can carry several boxes, whereby several orders may be packed simultaneously for increased efficiency. However, such a system requires a lot of storage space as all the items must be available for the picking arm to reach. This therefore decreases the efficiency of the system, as the vehicle must travel a long time around the warehouse to collect all the items.

U.S. Pat. No. 9,120,622B1, EP1122194A1, and WO2012055410A2 disclose systems and methods for automatic storage and retrieval of items.

SUMMARY

The invention has for its object to remedy or to reduce at least one of the drawbacks of the prior art, or at least provide a useful alternative to prior art. The object is achieved through features, which are specified in the description below and in the claims that follow. The invention is defined by the independent patent claims, while the dependent claims define advantageous embodiments of the invention.

In a first aspect, the invention relates more particularly to a system for automatic storage, picking, and packing of items, the system comprising An arrangement of shelves for supporting storage boxes for storing the items;

A movable robotic arm, the robotic arm being configured for reaching into and picking an item from a storage box on a shelf, and for grabbing and moving a storage box;

A camera mounted on the robotic arm;

A control unit comprising software for analysing data from the camera substantially in real-time, identifying the item to be picked by the robotic arm, and packing the picked item into a packing box;

wherein the arrangement of shelves comprises a first sub arrangement of shelves with a first vertical distance between the shelves, and a second sub arrangement of shelves with a second vertical distance between the shelves, wherein the first vertical distance is chosen to be able to accommodate the storage boxes and allow the robotic arm to reach into and pick an item from said storage boxes in the first sub arrangement of shelves, and wherein the second vertical distance is chosen so that each storage box must be moved out from the second sub arrangement of shelves before the robotic arm can pick an item from the storage box.

In an unclaimed embodiment of the invention, the system comprises at least two robotic arms, wherein at least one is configured for reaching into and picking an item from a storage box and at least one for grabbing and moving a storage box.

There is also disclosed herein a second system for automatic storage, picking, and packing of items, the second system comprising An arrangement of shelves for supporting storage boxes for storing the items;

A movable robotic arm, the robotic arm being configured for reaching into and picking an item from a storage box, and/or for picking an item directly from a shelf, and/or for grabbing and moving a storage box;

A camera mounted on the robotic arm;

A control unit comprising software for analysing data from the camera substantially in real-time, identifying the item to be picked by the robotic arm, and packing the picked item into a packing box;

wherein the system is configured to keep track of the items in the arrangement of shelves and automatically and dynamically arrange the items or boxes containing the items such that items picked with a higher frequency can on average be accessed and picked faster than items picked with a lower frequency. For example, the shelves may be large enough to support several boxes in the depth of the shelves, i.e. in a direction away from the robotic arm, whereby items picked with a lower frequency may be placed towards the rear of the shelves furthest away from the robotic arm, while items picked with a higher frequency may be placed toward the front of the shelves closest to the robotic arm. If an item picked with a low frequency is to be picked, it may be necessary to either move the boxes and/or items on the shelf closer to the robotic arm, or reach over these boxes and/or items if there is available space, and if the arm can reach the item to be picked. Based on available data, e.g. picking history and/or prediction from items on sale, the software will continuously evaluate whether an item in the arrangement of shelves should categorised as a high-frequency item or a low-frequency item and arrange the item or box containing the item accordingly. Such a continuous evaluation may also be used in an embodiment of the invention, whereby the items will be positioned in the first or second sub arrangement according to their categorisation. Rearrangement and picking may be done by the same robotic arm, or different robotic arms may be used for the picking and for the rearrangement. In this way the robotic arms used for picking are not required to be able to grab and move the boxes, as the other robotic arms may make the boxes or items available for the robotic arm used for picking.

The arrangement of shelves may typically comprise a plurality of shelves positioned above each other, thereby having a vertical distance between the shelves, e.g. as in a bookcase. The robotic arm may be able to move relative to the arrangement of shelves such that it is able to reach different storage boxes on a shelf, and on different shelves. Since the shelves can support boxes, they can typically also support items stored directly on the shelves. Similarly, the robotic arm can pick items which are located directly on the shelves. This may have the advantage that items which are picked with a high frequency may be placed directly on the shelves for easier access and thereby increased picking speed. Additionally, some items may be so big that it may not be of any advantage to place them in boxes. The arrangement of shelves may typically be arranged such that one or two sides are more easily accessible for the robotic arm, for example if the shelves are elongated and rectangular.

If the shelves are elongated and rectangular, the robot may typically reach the storage boxes from the longest side of said elongated and rectangular shelves, i.e. substantially perpendicularly to the longest direction of the shelves. The side of the arrangement of shelves where from the robotic arm reaches the boxes will be termed the front herein.

The robotic arm may for example be mounted on a movable vertical post, such that the arm may move vertically up and down on said vertical post, for example using wheel, gears and/or chains, and a motor. Similarly, the vertical post may be movably mounted on one or more horizontal posts and be able to move horizontally along these posts. In this way the movable arm may be able to move at least in two directions, thereby defining a movement plane for the robotic arm. The posts are not required to be positioned in the movement plane, as one or more may be offset from the plane. The posts may for example be suitably connected to the arrangement of shelves, whereby a stable movement relative to the arrangement of shelves is ensured. The robotic arm, possibly also posts whereon it may be mounted, may be configured to be able to be moved away from the arrangement of shelves, to make the shelves accessible for e.g. a forklift.

The robotic arm may for example comprise a base portion which is movable in two directions within a plane; a first arm portion which extends from the base portion and which is movable at least in the direction perpendicular to the plane; a second arm portion connected to the first arm portion through a joint which is configured such that the second arm portion is turnable around an axis which is substantially horizontal and perpendicular to the longitudinal direction of the first arm portion; and an end portion which is configured for picking up an item, turning the item around an axis parallel to the longitudinal direction of the second arm portion, and letting go of the item. Such a robotic arm may also be an invention by itself. The advantage of this design of the robotic arm may be that it is relatively simple, while it still contains the degrees of freedom of movement necessary for effective picking and precise packing of items from within storage boxes on an arrangement of shelves to packing boxes.

The end portion of the robotic arm may for example be one or more suction cups. The arm should also be able to grab and move a box, e.g. a storage box or a packing box, either by the same picking means as for picking up and packing individual items, or by additional means. A storage box and a packing box may be the same type of box. Additionally, a storage box may also be a distribution box, i.e. a box which has been used to ship a plurality of items to the location of the system. Therefore, if a box is referred to, without the designation of a storage box, a distribution box, or a packing box, it may be either of them.

The camera provides the control unit with the data necessary to identify and pick and pack the items, for example video or image data with information on the depth of the image or video. In this way the distance from the robotic arm to the items or boxes may be derived. The control unit may comprise software for analysing data form the camera substantially in real-time and determine how to pick and pack the items. The software may be able to keep track of the boxes of items and items stored directly on the shelves, identify shapes of the items for correct picking of said items, and know where to pack the items. The software may be configured to be able to learn continuously, thereby improving the picking and packing efficiency for every picked item. The software may also communicate with a cloud platform, whereby data from different installations of the system may be analysed. In this way different installations may learn from each other, thereby increasing the learning rate of the system. Such a system may not need to perform 3D scans of the items prior to the items being picked and packed.

In this way the robotic arm may be able to reach into a storage box, identify an item in said storage box using the camera and the control unit, pick up the item, and place said item in a packing box. The robotic arm may also be able to pick items directly from the shelves, so the items are not required to be placed within a storage box. The system may also be combined with manually picking if desired.

The packing box can be a customer paper box, a re-usable plastic box, or a tray or box comprising a bag, which allows the robotic arm to pack the items directly into the bag. The packing box may also be a box or a tray that is used in a temporary manner, so that the items are packed into the box before the content is transferred into a bag. This transfer can be done before the robotic arm places the packing box in a buffer area for subsequent shipment or collection.

The robotic arm can pack directly into packing boxes with an optimization algorithm to minimize space and to place items in a stable manner. The robotic arm can also be configured to push the items into place for tight packing, and it can use information about available space and the products already in the packing box to select where to place an item. The packing algorithm can take into account information about sensitivity of products, size, and whether they are sensitive towards how they are turned.

The robotic arm can pick items based on recognition, in which case it knows the size beforehand, which it can use to decide how to pack in the best manner, or it can pick items of unknown size, in which case it can scan the product with its own camera and measure the size before placing the item in the packing box.

The picking and packing sequence can either be optimized based on the packing sequence to minimize the space the fulfilled order takes, or to minimize the picking and packing time. These two ways of optimizing can be configured by the user of the system or selected automatically based on information about the products and orders.

The first sub arrangement of shelves allows the robotic arm to reach directly into a storage box on a shelf and pick an item from said storage box, resulting in a high picking efficiency of items in the first sub arrangement. The first sub arrangement is therefore advantageous for items which are expected to be picked with a high frequency. Items expected to be picked with a high frequency are from here on called high-frequency items, while items expected to be picked with a low frequency are called low-frequency items. Since the shelves in the first sub arrangement must be able to accommodate both the storage boxes and a portion of the robotic arm, the distance between the shelves must be relatively large. The robotic arm may also be able to reach into boxes which are positioned behind the front box, so boxes with different types of items may be placed behind the front box. As empty space above the storage boxes can be considered as wasted space, the first sub arrangement is not optimal for providing a high storage density of items. However, the storage density in the second sub arrangement of shelves can be high, since the distance between the shelves is smaller and chosen to be able to accommodate essentially the storage boxes only. Thus, each box must be moved out, or retrieved, from the shelf before the robotic arm can pick an item from the box. A high combined picking efficiency and storage density can therefore be obtained by including both a first and a second sub arrangement of shelves and storing high-frequency items, where time is most important, in the first sub arrangement, and low-frequency items, where storage density is most important, in the second sub arrangement. The first sub arrangement of shelves may advantageously be positioned in a central position close to the packing boxes to be packed, whereby the robotic arm may spend less time moving. For low-frequency items, a plurality of storage boxes each comprising a different type of items may be placed behind each other on a shelf, whereby the robotic arm may have to retrieve and move the boxes in front to access a desired storage box further behind. This may result in a very high storage density of items. In one embodiment of either system, the robotic arm may be configured for grabbing and moving a box by comprising a hook which complement a handle on the box. This is a simple but effective way of moving the boxes around, whereby the robotic arm can be made relatively simple and cheap. If the robotic arm comprises an arm portion which is turnable around an axis which is substantially horizontal, said second arm portion of the robotic arm may comprise a hook configured for grabbing a complementary handle on a box when the second arm portion is turned. In this way the robotic arm can grab and move a box with only a small modification of said arm. This will therefore be a simple and cheap way for the robotic arm to be able to grab and move a box.

In one embodiment of either system, the system may comprise a supporting frame for supporting a box, where the supporting frame may be mounted on or below the robotic arm, for example on a base portion of the arm, or below the arm on a vertical post whereon the robotic arm may also be mounted. In this way the box can rest on the supporting frame while being moved such that the robotic arm is not required to carry the weight of the box while it is being moved, but only pull the box onto the supporting frame. This puts less requirements on the strength of the robotic arm. The arm may for example use the picking means also for pulling the box onto the supporting frame, or alternatively dedicated means for grabbing and moving the box. For the second sub arrangement of the shelves, the box may be pulled onto and rest on the supporting frame while the robotic arm picks an item from the box, and then pushed back onto the shelf again.

The supporting frame may be turnable around a substantially vertical axis. In this way the supporting frame may move the boxes from one side of the robotic arm to the other side, for example to make the box available for another robotic arm. A turnable supporting frame may reduce or eliminate the need for conveyor belts.

In one embodiment of either system, at least one of the storage boxes may comprise a sidewall which may be opened using the robotic arm, whereby the items in the storage box may be picked straight from the shelf. This may for example be advantageous if the items in the box are tall, whereby they can be difficult to pick up from the box in the first sub arrangement of shelves. Additionally, in the second sub arrangement of shelves, the items may be picked straight from the storage box without moving said storage box out from the shelf. The side wall of the boxes may for example be able to slide downwards below the bottom of the box when the picking means engages said front wall, for example if the picking means is a suction cup.

Distribution boxes containing items may also be placed directly in the arrangement of shelves, if the sizes of the distribution boxes are compatible with the arrangement of shelves. This may save time and effort for rearranging the items into storage boxes. Items within suitable distribution boxes may then be picked either from the front if placed in either the first or the second sub arrangement of shelves, or from the top if placed in the first sub arrangement. The distribution boxes must be opened in such a manner that the system may locate and pick the contents within. A distribution box may be removed when empty, and another distribution box from behind may be made available. It may also be possible to store and pick some items directly from the shelves without the use of storage boxes for these items.

In one embodiment of either system, the system may comprise an arrangement of shelves substantially parallel to each other on opposite sides of the robotic arm. This will allow the robotic arm to pick from twice as many items from within the same movement area, e.g. movement plane, which will increase the picking efficiency and/or the storage density of items per robotic arm. In this embodiment, the system may also comprise two robotic arms extending in opposite directions and being configured for reaching into and picking an item from a box, and for grabbing and moving a box, on substantially parallel arrangements of shelves on opposite sides of the robotic arms. The two robotic arms may for example share the same base portion or be movably mounted on the same or different vertical posts depending on the desired degree of freedom for movement. Having two robotic arms for two arrangements of shelves will increase the picking efficiency, as the time it takes for the robotic arm to turn 180° between picks on each arrangement is saved. Additionally, the arms may work simultaneously and cooperate.

In one embodiment of either system, the shelves may be inclined for the boxes to slide down said shelves, whereby boxes may be placed on one side of a shelf and slide towards the other side, for example towards the robotic arm. This will have the advantage that the shelves may be refilled with storage boxes from the opposite side of the shelf than the robotic arm. The shelves may also be filled from the same side as the robotic arm, i.e. the lowermost side of the shelves, for example by the robotic arm. It this way the boxes or items which are already on the shelf will be pushed back up the inclined shelf when a new box or item is placed on the shelf. In this way the robotic arm will have access to all boxes or items in the shelf from the same side of the shelf by rearranging the boxes. It may also have the advantage that several storage boxes containing the same items may be placed in series after each other on a shelf, so when one storage box is empty it may be removed by the robotic arm and a full storage box is immediately available. This is especially advantageous for items which are picked frequently or are large whereby storage boxes quickly become empty. The boxes placed in series after each other on the shelf may also contain different items, which may increase the number of different types of items which are available for the robotic arm. This is more advantageous for items which are picked less frequently. One or some of the inclined shelves may have the inclination opposite than that of the other shelves, whereby for example empty storage boxes may be placed on this shelf and slide away from the robotic arm to the other side of the shelf. The inclination of the shelves may for example have an angle relative to horizontal of 5, 10, 15, 20, 30, or 45 degrees, or any other suitable angle. Different shelves may have different inclinations. For example, as inclined shelves may make the direct picking of items more efficient, the first sub arrangement of shelves may have a greater inclination than the second sub arrangement of shelves.

In this way a greater inclination of the shelves in the first sub arrangement may result in easy access to the storage boxes, while the smaller inclination of the shelves in the second sub arrangement may cause the boxes to slide slowly along the shelves.

In one embodiment of either system, the system may comprise a cooperating robot on opposite side of the arrangement of shelves than the robotic, the cooperating robot being configured for grabbing and moving a box. The cooperating robot may thus be able to refill the arrangement of shelves with storage boxes from said opposite side of the arrangement of shelves. The cooperating robot may also be a robotic arm. This will make the system effective, as the shelves are not required to be refilled manually. In this way, the system may also be designed such that it does not need any manual work if the system is being provided with new storage boxes while packed packing boxes are being removed from the system. For example, new storage boxes may be supplied to the system at a supply station, where from the cooperating robot may grab the storage boxes and place them at specific locations on the shelves such that the robotic arm can pick individual items from said storage boxes. The robotic arm may move packed packing boxes to a delivery station for packed packing boxes and empty boxes to a delivery station for empty boxes. Alternatively, the robotic arm may move empty boxes to the cooperating robot which can then move the empty boxes to a delivery station for empty boxes or store them temporarily until they can be picked up or refilled. Alternatively, the empty storage boxes may be used as packing boxes.

The robotic arm may be placed side by side, or behind each other, allowing the robotic arms to feed boxes to each other, for example through the gravity rollers. This allows several robotic arms to cooperate for fulfilling orders, where each robotic arm can have specific end effectors, e.g. a suction cup, designed to handle specific product types. This allows a dynamic picking zone setup, where the products which are most easily accessible to the robotic arm to pick and pack can be chosen by the system based on the popularity of the product at any given time, and on which products the robotic arm can pick based on the end effector and picking and packing capacity. When several robotic arms are placed side by side, each robotic arm can serve specific products, and when further robotic arms are added behind the shelves relative to these robotic arms, the further robotic arm behind can feed products that are popular at a given time to the robotic arms at the front. A third and fourth etc row of robotic arms can be added as well, allowing picking from the front shelves, and buffer area with products that are most popular in the middle shelves, while the shelves in the back are used for storage of less popular products and of products that are already available in the middle or front shelves.

In one embodiment of either system, the system may comprise a trolley comprising shelves for supporting packing boxes. The shelves of the trolley may be inclined, and the arrangement of shelves may have an available space for positioning the trolley. The trolley may be slotted into the available space of the arrangement of shelves, thereby allowing the robotic arm to access the trolley from the front, and operators to insert and retrieve said trolley from the back. The trolley may thereby act as a buffer region for the packing boxes, allowing operators to retrieve the packed items while the robotic arm is in operation. The trolley may be placed into the slots either empty, thereby creating a buffer region or buffer area, or loaded with storage boxes that may be replaced before the trolley can be used as a buffer region for packing boxes.

The robotic arm can lift the packing boxes directly into the buffer area for fulfilled orders, which can for example be a push back shelf tilting away from the robotic arm, or a trolley tilting towards or away from the robotic arm. This allows the robotic arm to pick and pack continuously.

The robotic arm can feed empty customer boxes from shelves which are tilted towards the robotic arm, pack into them, and then move them to a buffer area for fulfilled orders.

When the robotic arm packs into re-usable boxes, these can be fed again into the system after packing the order, allowing circulation of the boxes to be packed into.

Either system may not require a conveyor belt, which makes the system simpler. All movement of the boxes may for example be performed by the robotic arms, supporting frames, trolleys, and/or due to inclined shelves. The system can also be used together with a conveyor, where the packing boxes move on the conveyor beside each robotic arm in each picking zone, thereby allowing the robotic arms to cooperate fulfilling the orders. In this case the conveyor is placed between the shelf and the robotic arm or under or over the shelf. In one embodiment, there is a main conveyor under the shelf, with conveyors coming from the main conveyor feeding packing boxes to each robotic arm The packing boxes may then be sorted into the conveyors for each robotic arm when there are products that need to be from the robotic arm in that picking zone.

In a second aspect, the invention relates more particularly to a method for automatic storage, picking, and packing of items using the system according to the first aspect of the invention, the method comprising the steps of distributing the items for storage in the arrangement of shelves; and automatically picking and packing the items from the arrangement of shelves using the movable robotic arm, wherein high-frequency items are stored in the first sub arrangement of shelves, and low-frequency items are stored in the second sub arrangement of shelves, so that the robotic arm can pick the high-frequency items faster than the low-frequency items. In this way, the robotic arm will spend less time on picking items than if the items were not stored according to frequency of picking. For example, items may be stored in boxes suitable for direct picking by the robotic arm in a large storage area, and the high-frequency items may be stored closer to a central position than the low-frequency items. A central position may for example be where the items are packed into packing boxes. This will cause the robotic arm to spend less time moving around the storage area, and thereby less time on picking.

There is also disclosed a second method for automatic storage, picking, and packing of items, the second method comprising repeating the steps of
  distributing the items for storage in an arrangement of shelves using the movable robotic arm such that the items which are picked with a high frequency can on average be picked faster than items picked with a lower frequency;
  evaluating the distribution and picking frequency of the items in the shelves to determine whether items which are picked with a high frequency can on average be picked faster than items picked with a lower frequency;
  rearranging the items in the shelves based on the evaluation from the preceding step; and
  automatically picking and packing the items from the arrangement of shelves using the movable robotic arm.

For both methods, the items may be distributed along the height, width, and depth of the shelves.

In one embodiment of either method, the step of distributing the items for storage in the arrangement of shelves may comprise distributing and storing the items in their distribution boxes. This will make the method more efficient, as the items are not required to be moved from their distribution boxes to storage boxes.

In one embodiment of either method, when picking a low-frequency item, the step of automatically picking and packing items may additionally comprise the step of grabbing and moving a box containing the items prior to picking the item from the box. The high-frequency items may be stored in boxes in the first sub arrangement of shelves in a central position of the storage area, and the low-frequency items may be stored in the second sub arrangement of shelves around the central position. In this way the low-frequency items will be stored with a higher storage density, whereby less storage area is needed for storing items, while the ability to pick high-frequency items rapidly is maintained.

BRIEF DESCRIPTION OF THE DRAWINGS

In the following are described examples of preferred embodiments illustrated in the accompanying drawings, wherein.

DETAILED DESCRIPTION OF THE DRAWINGS

Figure 1:
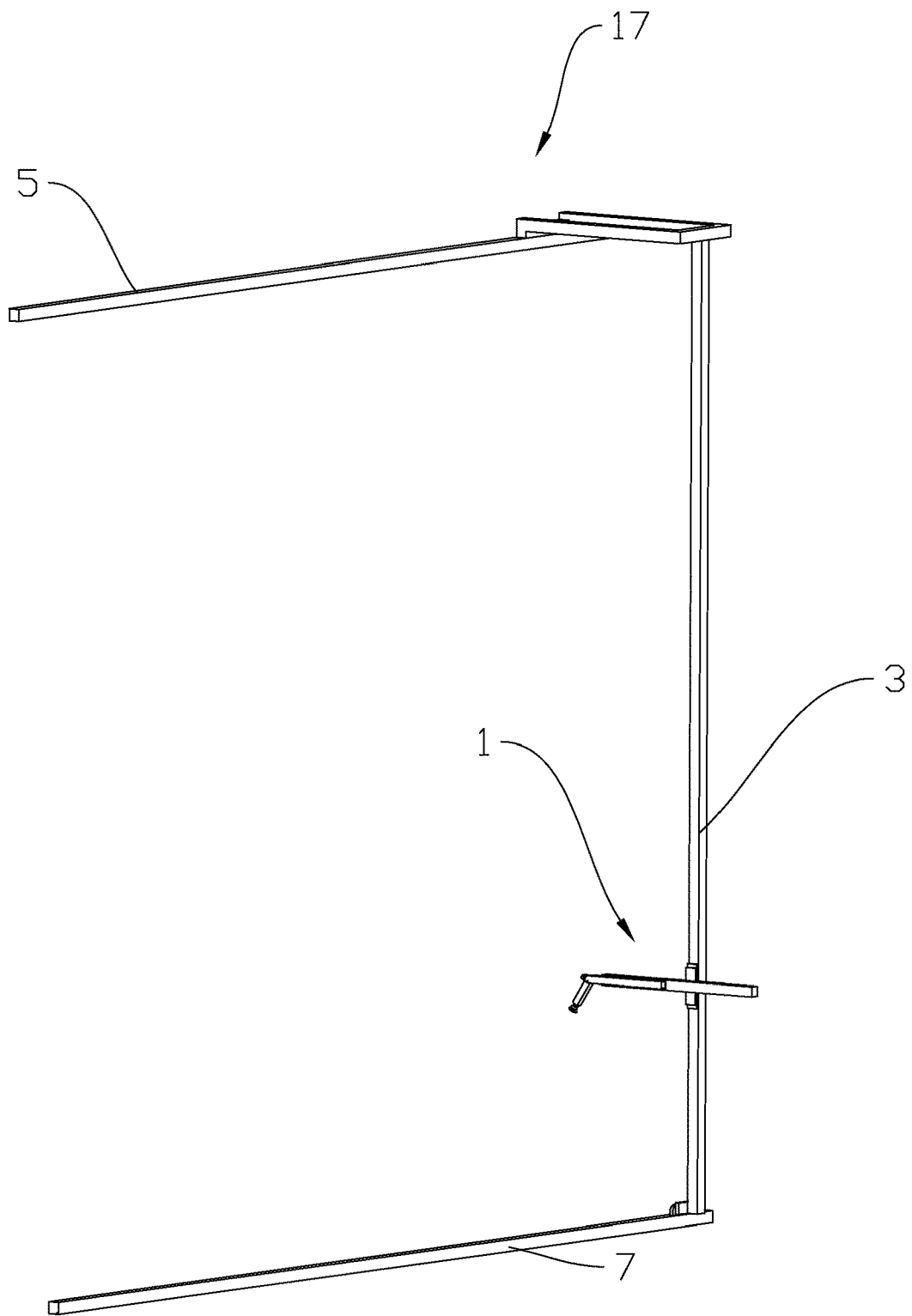
FIG. 1 shows a robotic arm according to the invention mounted on a movable post.

In the drawings, the reference numeral 1 indicates a robotic arm as used in a system according to the invention. The drawings are schematic, and the features therein are not necessarily drawn to scale. Identical reference numerals indicate identical or similar features.

FIG. 1 shows a robotic arm 1, as used in a system according to the invention, within a movement frame 17. The movement frame 17 comprises a vertical post 3, whereon the arm 1 is movably mounted, and an upper 5 and lower 7 horizontal post, whereon the end portions of the vertical post 3 is movably mounted. The movable arm 1 may for example move along the vertical post 3 using gears and/or a chain (not shown) together with a motor. The vertical post 3 may move horizontally along the horizontal posts 5, 7 by a similar mechanism. The horizontal posts 5, 7 may be supported by two stationary vertical posts (not shown), or they may be suitably connected to the arrangement of shelves 9 (not shown in this figure). The robotic arm 1 can thereby move in two directions within the plane of the movement frame 17. In embodiments of the invention, the movement frame 17 may comprise several robotic arms 1, for example mounted on the different verticals posts 3 which are movably mounted on the horizontal posts 5, 7.

Figure 2:
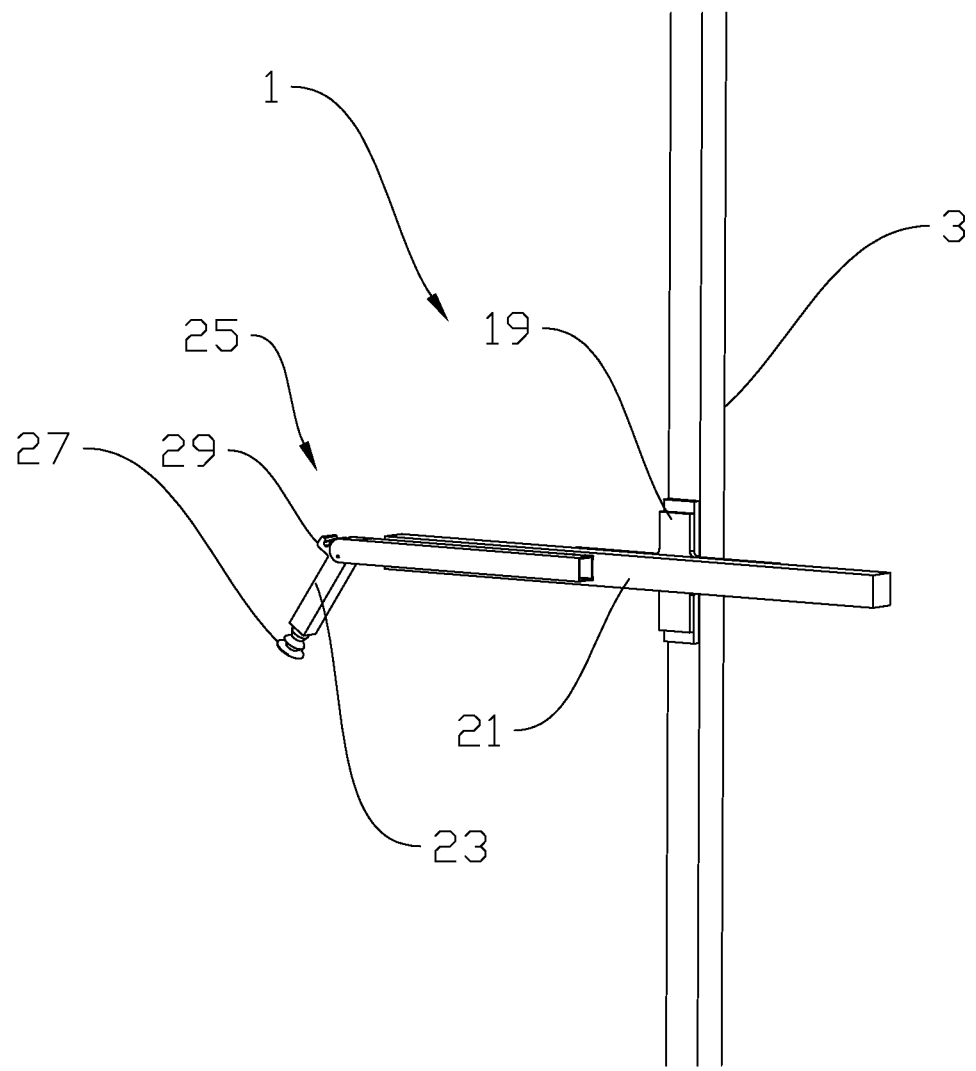
FIG. 2 shows a more detailed view of the robotic arm from FIG. 1.

FIG. 2 shows a more detailed view of the robotic arm 1 from FIG. 1 without a movement frame 17. The arm 1 comprises a base portion 19 which is movably mounted on the vertical post 3. The robotic arm 1 comprises a first arm portion 21 which extends from the base portion 19 and which is movable in the direction perpendicular to the plane of the movement frame 17. The robotic arm 1 also comprises a second arm portion 23 which is connected to the first arm portion 21 through a joint 25, such that the second arm portion 23 may turn around an axis which is substantially horizontal and parallel to the plane of the movement frame 17. In this way, the arm 1 may reach above the edge of a storage box 39 (not shown in this figure) and turn the second arm portion 23 to reach into the storage box 39. At the end of the second arm portion 23, the robotic arm 1 comprises a picking means, here shown as a suction cup 27, which is configured for picking up an item (not shown), turning the item around an axis parallel to the longitudinal direction of the second arm portion 23, and letting go of the item. In the shown embodiment, the second arm portion 23 also comprises a hook 29, which may be used to grab a storage box 39. Additionally, the arm 1 comprises a camera (not shown).

Figure 3:
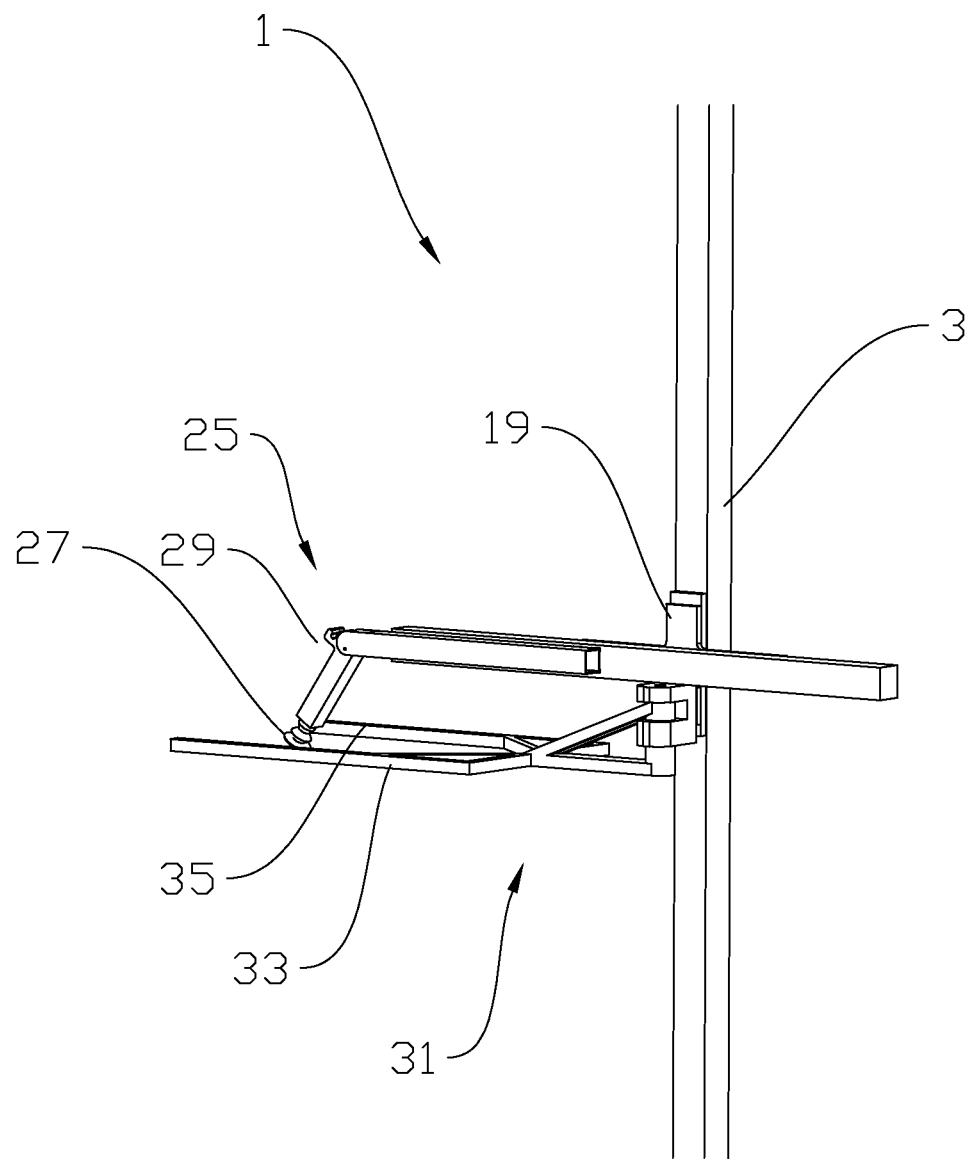
FIG. 3 shows the robotic arm from FIG. 2 with a turnable supporting frame.

FIG. 3 shows the robotic arm 1 from FIG. 2, which additionally comprises a supporting frame 31 for supporting a box (not shown) attached at the base portion 19 of the arm 1. The supporting frame 31 comprises two supporting rails 33, 35 whereon a box may be supported. The supporting frame 31 may additionally comprise guides (not shown) at the sides for guiding a box onto the supporting frame 31 and ensure that the box does not fall sideways off the supporting frame 31. Guides may be particularly useful if boxes of a single size are used. The supporting frame 31 is rotationally attached to the base portion 19 of the arm 1 such that the supporting frame 31 may turn around a vertical axis. In this way, the supporting frame 31 may move a box from one side of the robotic arm 1 to the other.

Figure 4:
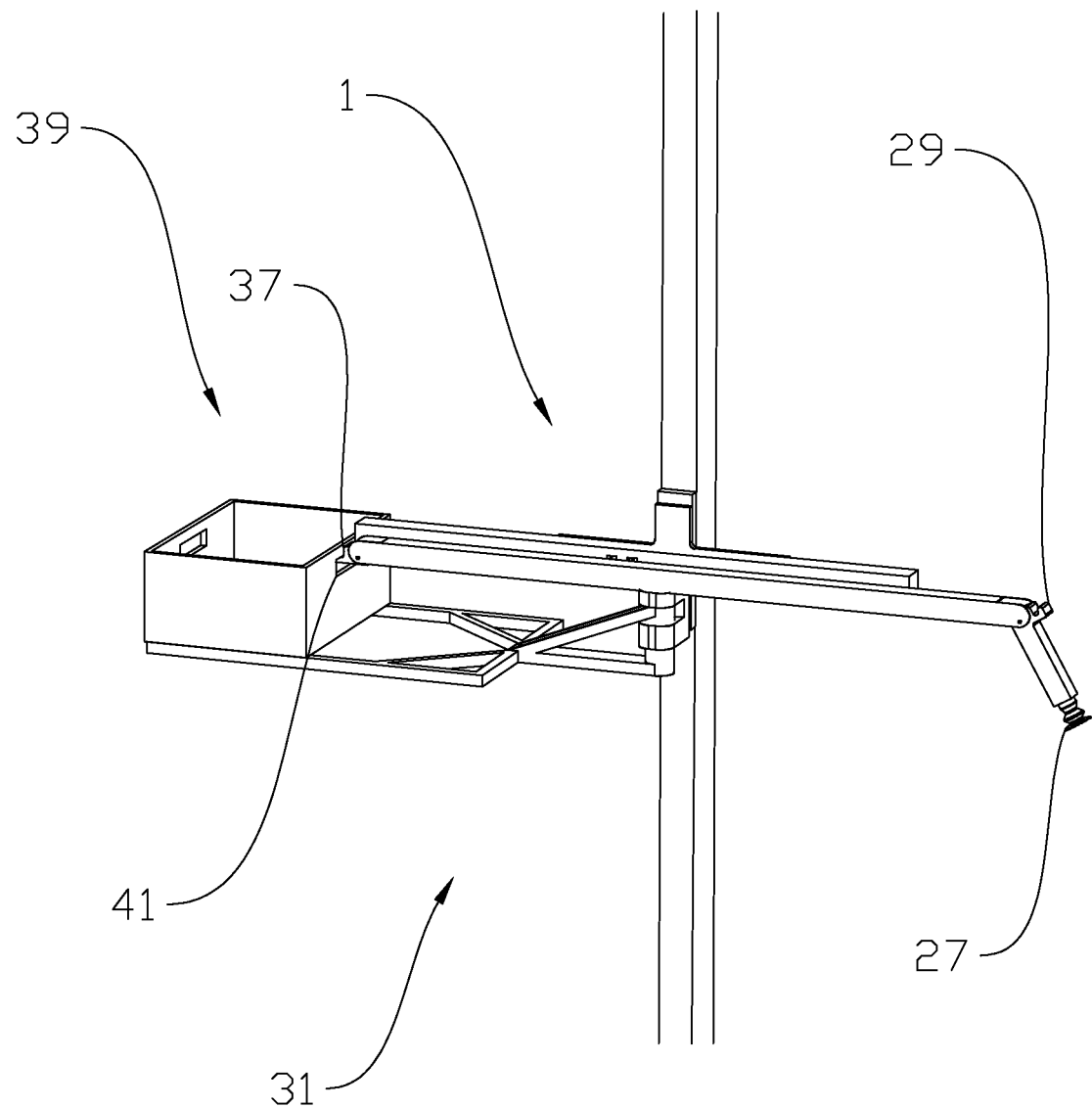
FIG. 4 shows the robotic arm and turnable supporting frame from FIG. 2, where the supporting frame supports a box.

FIG. 4 shows a robotic arm 1 which comprises an additional hook 37 on the opposite side of the robotic arm 1 than the suction cup 27, even though the side with the suction cup 27 also comprises a hook 29. The additional hook 37 has been used to grab a box 39 pull said box 39 onto the supporting frame 31 by the robotic arm 1. The hook 37 has grabbed the box 39 by the complementary handle 41.

Figure 5:
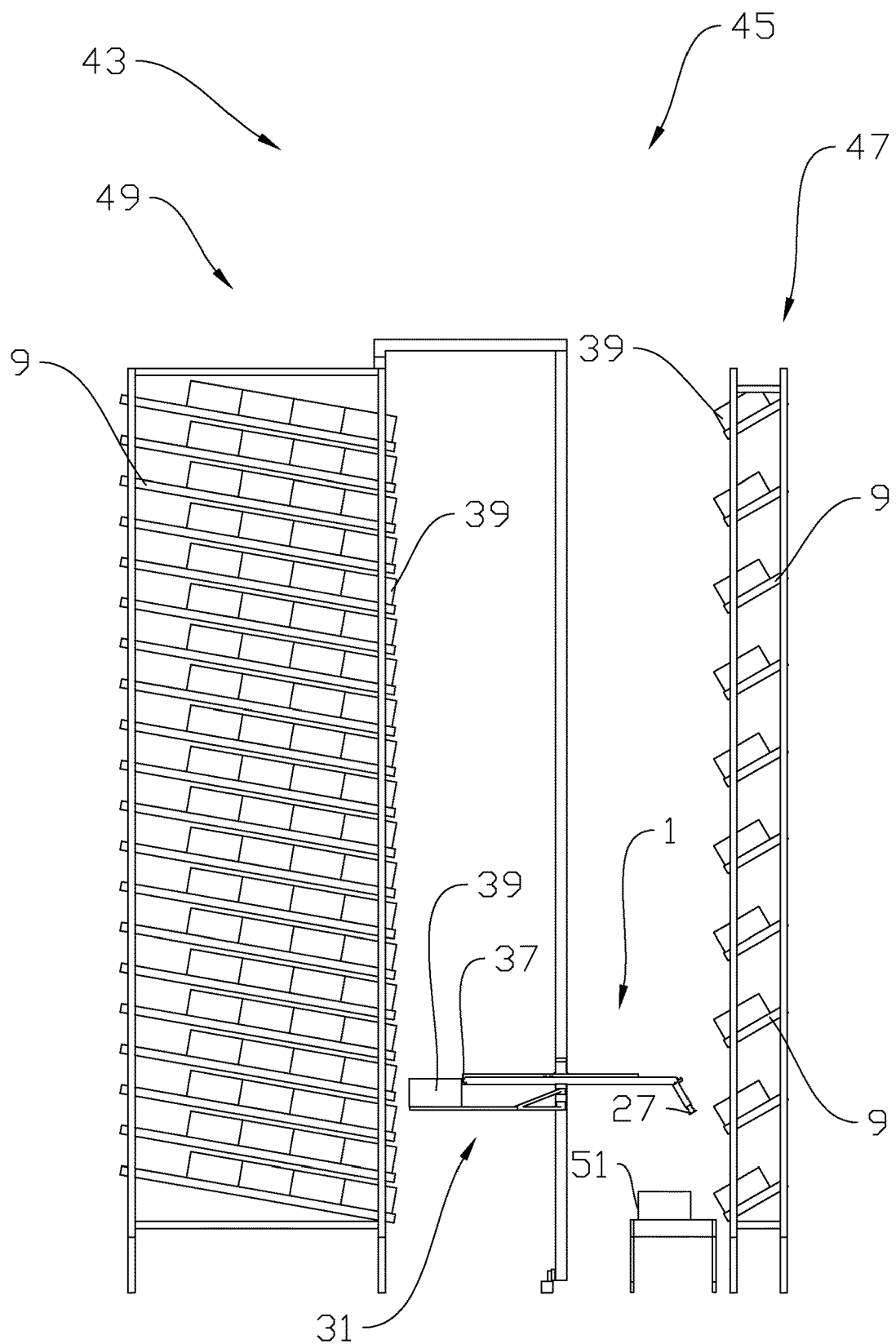
FIG. 5 shows a system for automatic storage, retrieval, picking and packing of items according to the invention.

FIG. 5 shows a system 43 for automatic storage, picking and packing items. The system 43 comprises an arrangement 45 of shelves 9 which comprises a first sub arrangement 47 of shelves 9 and a second sub arrangement 49 of shelves 9. In the first sub arrangement 47, the distance between the shelves 9 is large enough to accommodate both a box 39 and a portion of the robotic arm 1. The robotic arm 1 is thus able to pick items directly from the storage boxes 39 in this sub arrangement 47 without having to retrieve the storage boxes 39. Items from the first sub arrangement 47 can thereby be picked very efficiently, so high-frequency items may advantageously be placed in this sub arrangement 47. In the second sub arrangement 49 of shelves 9, the distance between the shelves 9 is chosen to accommodate essentially only the boxes 39. The distance between the shelves 9 in the second sub arrangement 49 may of course be slightly larger than the height of the boxes 39 such that the boxes do not get stuck between the shelves 9. As clear form the figure, the second sub arrangement 49 thus has a very high storage density. However, as the distance between the shelves 9 in the second sub arrangement 49 only accommodates the boxes 39, the boxes must be retrieved from the shelves 9 before the robotic arm 1 can pick items from the box 39. In the shown embodiment, for the robotic arm 1 to pick an item from a box 39 from the second sub arrangement 49 of shelves 9, the box 39 may be pulled onto the supporting frame 31 by a hook 37 on the end of the robotic arm 1 which is opposite to the suction cup 27, and the supporting frame 31 may be rotated 180° about a vertical axis to be at the same side of the robotic arm 1 as the suction cup 27. The arm 1 may then pick an item from the box 39, which may thereafter be returned to the second sub arrangement 49, while the item is packed into a packing box 51. The shelves 9 are inclined, such that boxes 39 may slide towards the side of the arrangement 45 of shelves 9 where the robotic arm 1 is positioned.

Figure 6:
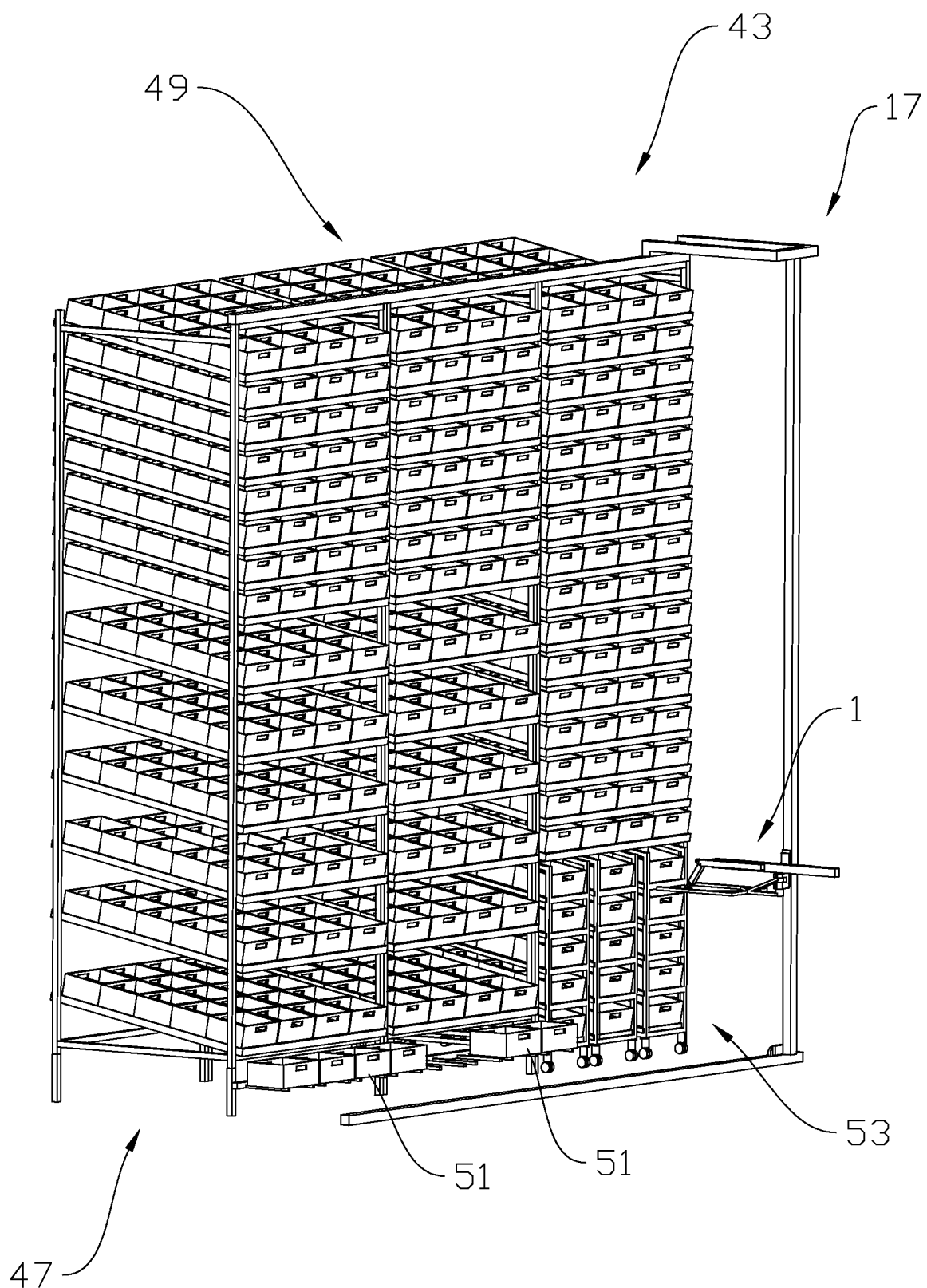
FIG. 6 shows another system for automatic storage, retrieval, picking and packing of items according to the invention.

FIG. 6 shows a system 43 for automatic storage, picking and packing of items, wherein the arrangement 45 of shelves 9, wherein a first 47 and second 49 sub arrangement of shelves 9 is positioned next to each other at the same side of the plane of the movement frame 17 of the robotic arm 1. Here the items may be picked more efficiently, however, fewer items can be reached by the robotic arm 1. The system 43 comprises packing boxes 51 for packing of the picked items. When the packing boxes 51 are packed, they may be moved to a trolley 53 for being collected. The shelves 9 of the trolley 53 may also be inclined, such that several packing boxes 51 may be placed on each shelf 9 of the trolley 53 simply by using the packing box 51 grabbed by the robotic arm 1 to push back the packing boxes 51 already placed on said shelf 9. The system 43 shown in this figure is thus conveyor-free, i.e. no conveyor is included in the system 43. In this way, the system 43 can easily be installed in e.g. a store without the need for installing a large conveyor system.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. A system for automatic storage, picking, and packing of items, the system comprising:
    an arrangement of shelves for supporting storage boxes for storing the items;
    a movable robotic arm, the robotic arm being configured for reaching into and picking an item from a storage box on a shelf, and for grabbing and moving a storage box;
    a camera mounted on the robotic arm;
    a control unit comprising software for analyzing data from the camera substantially in real-time, identifying the item to be picked by the robotic arm, and packing the picked item into a packing box;
    wherein the arrangement of shelves comprises a first sub arrangement of shelves with a first vertical distance between the shelves, and a second sub arrangement of shelves with a second vertical distance between the shelves, wherein the first vertical distance is chosen to be able to accommodate the storage boxes and allow the robotic arm to reach into and pick an item from said storage boxes in the first sub arrangement of shelves, and wherein the second vertical distance is chosen so that each storage box must be moved out from the second sub arrangement of shelves before the robotic arm can pick an item from the storage box.

2. The system according to claim 1, wherein the robotic arm is configured for grabbing and moving a storage box by comprising a hook which complements a handle on the box.

3. The system according to claim 1, wherein the system comprises a supporting frame for supporting a box, said supporting frame being mounted on or below the robotic arm.

4. The system according to claim 3, wherein the supporting frame is turnable around a vertical axis.

5. The system according to claim 1, wherein the shelves are elongated and rectangular and the robotic arm reaches the storage boxes from the longest side of the elongated and rectangular shelves, and wherein the system comprises an arrangement of shelves substantially parallel to each other on opposite sides of the robotic arm.

6. The system according to claim 5, wherein the system comprises two robotic arms extending in opposite directions and being configured for reaching into and picking an item from a storage box, and for grabbing and moving a storage box, on the substantially parallel arrangements of shelves on opposite sides of the robotic arms.

7. The system according to claim 1, wherein the shelves are inclined for the storage boxes to slide down said shelves.

8. The system according to claim 1, wherein the system comprises a cooperating robot on opposite side of the arrangement of shelves than the robotic arm, the cooperating robot being configured for grabbing and moving a storage box.

9. The system according to claim 1, wherein system comprises a trolley comprising shelves for supporting packing boxes.

10. A method for automatic storage, picking, and packing of items using the system comprising:
- an arrangement of shelves for supporting storage boxes for storing the items;
- a movable robotic arm, the robotic arm being configured for reaching into and picking an item from a storage box on a shelf, and for grabbing and moving a storage box;
- a camera mounted on the robotic arm;
- a control unit comprising software for analyzing data from the camera substantially in real-time, identifying the item to be picked by the robotic arm, and packing the picked item into a packing box;
- wherein the arrangement of shelves comprises a first sub arrangement of shelves with a first vertical distance between the shelves, and a second sub arrangement of shelves with a second vertical distance between the shelves, wherein the first vertical distance is chosen to be able to accommodate the storage boxes and allow the robotic arm to reach into and pick an item from said storage boxes in the first sub arrangement of shelves, and wherein the second vertical distance is chosen so that each storage box must be moved out from the second sub arrangement of shelves before the robotic arm can pick an item from the storage box, further comprising the steps of:
- distributing the items for storage in the arrangement of shelves; and
- automatically picking and packing the items from the arrangement of shelves using the movable robotic arm,
- wherein high-frequency items are stored in the first sub arrangement of shelves, and low-frequency items are stored in the second sub arrangement of shelves, so that the robotic arm can pick the high-frequency items faster than the low-frequency items.

11. The method according to claim 10, wherein the step of distributing the items for storage in the arrangement of shelves comprises distributing and storing the items in their distribution boxes.

12. The method according to claim 10, wherein, when picking a low-frequency item, the step of automatically picking and packing items additionally comprises the step of grabbing and moving a storage box containing the items prior to picking the item from the storage box.

* * * * *